Sheet 2 - 2 Sheets.
A. Eliaers,
Music Stand,
N° 18,239. Patented Sep. 22, 1857.
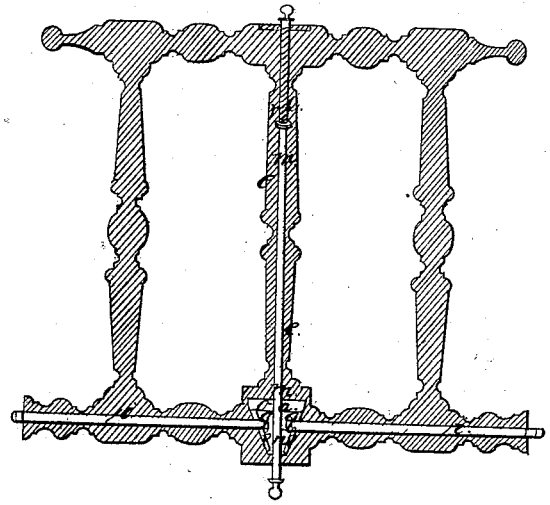
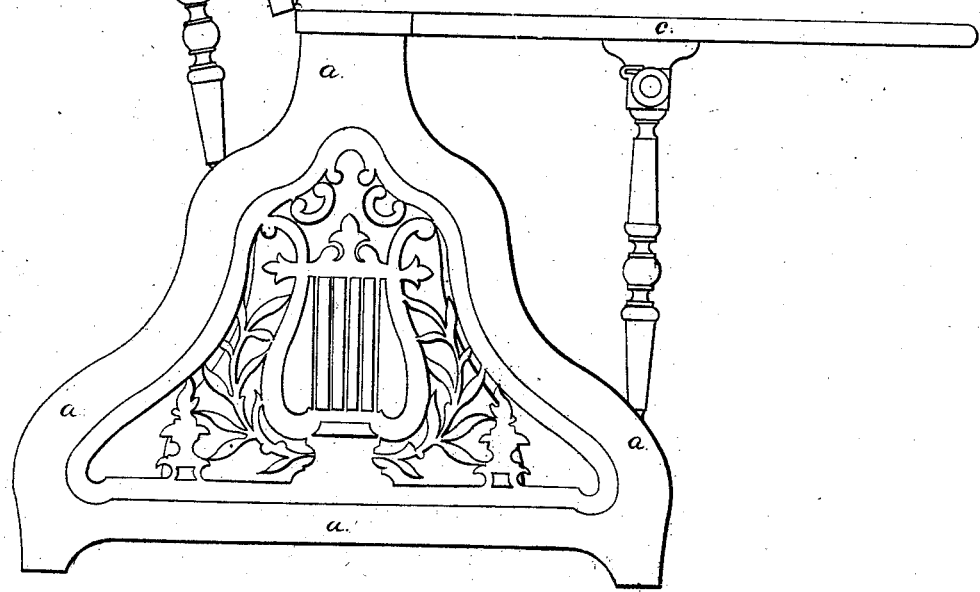
Witnesses:
Joseph Gavett
Samuel N. Piper
Inventor:
Augustus Eliaers

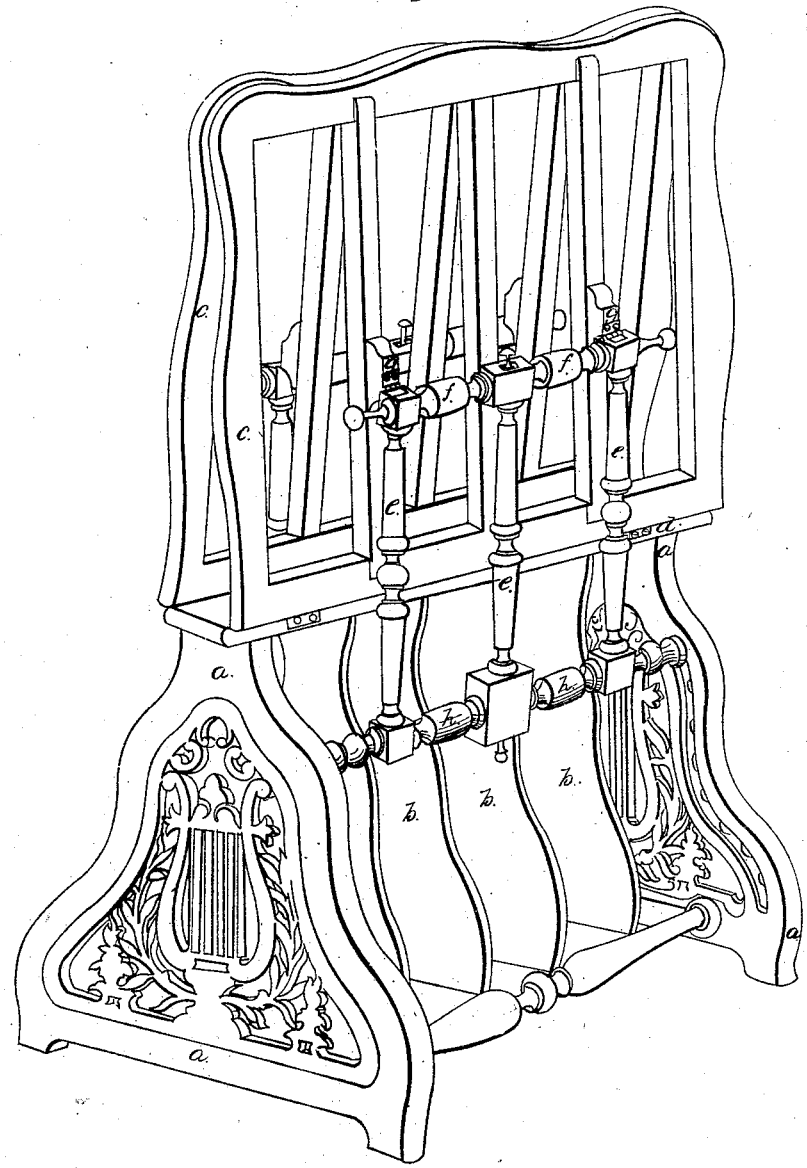

UNITED STATES PATENT OFFICE.

AUGUSTUS ELIAERS, OF BOSTON, MASSACHUSETTS.

PORTFOLIO OR MUSIC STAND.

Specification of Letters Patent No. 18,239, dated September 22, 1857.

*To all whom it may concern:*

Be it known that I, AUGUSTUS ELIAERS, of Boston, in the county of Suffolk and State of Massachusetts, have invented certain new and useful Improvements in Portfolio or Music Stands, and that the following description, taken in connection with the accompanying drawings, hereinafter referred to, forms a full and exact specification of the same, wherein I have set forth the nature and principles of my said improvements, by which my invention may be distinguished from others of a similar class, together with such parts as I claim and desire to have secured to me by Letters Patent.

The figures of the accompanying plate of drawings represent my improvements.

In Plate 1, Figure 1 is a perspective view of my improved stand for music, &c. In Plate 2, Fig. 2 is a side elevation of the same, and Fig. 3 a transverse vertical section in the plane of the line A B, Fig. 2. In Plate 3, Fig. 4 is a sectional view of the beveled box for actuating the locking devices.

In the stands used for containing music, portfolios of engravings, &c., as heretofore constructed, the two leaves have been supported by diagonal arms or braces that engaged with ratchet teeth formed in the bottom framework. As a consequence of this arrangement the leaves could not be strongly and rigidly supported in any desired position, while also the stand could not be lifted by the leaves to move it from place to place, because the supporting braces could not be locked in position in the ratchet teeth and would be thereby disengaged from the same. By the present invention I am enabled not only to support the leaves in the strongest manner by keeping the braces always in front of the leaves, and in a vertical or nearly vertical position, instead of a diagonal one, but also to lock the said braces so that they shall be fastened rigidly to the end framework of the stand at whatever angle they may be placed and so that the whole can be lifted thereby.

$a\ a$—$a\ a$ in the drawings represent the framework of the stand.

$b,\ b$, &c., are compartments in the lower portion of the stand to contain books, music, &c.

$c\ c$ are the leaves turning on hinges $d,\ d$. The leaves are supported by braces $e\ e$, &c., the upper cross bar $f\ f$ of which is hinged to the leaves at $g\ g$. The lower cross bar $h\ h$, has extending through it two horizontal rods $i\ i$, the ends of which travel in the curved grooves $k,\ k$ formed in the end framework $a\ a$, and are operated so as to be engaged and disengaged at pleasure with notches or holes $l,\ l$, &c., formed in the said grooves as follows:—Through the central vertical brace $e\ e$ plays a rod $m\ m$ attached near its lower end by pins $n,\ n$ to a beveled box $o$, Fig. 3, Plate 2, upon the flanges $p$ of which the hooks $q,\ q$ of the horizontal rods $i,\ i$ slide. A spiral spring $r$, upon the rod $m\ m$, presses constantly upon the rod $m\ m$ and consequently upon the beveled box $o$, and thereby causes the ends of the horizontal rods $i,\ i$ to enter the holes or notches $l,\ l$ of the curved grooves $k,\ k$ whereby the braces $e\ e$ are kept rigidly locked in whatever position they may be. By pressing the rod $m\ m$ upward with either the hand or the foot, the horizontal rods $i\ i$ will be disengaged from the notches $l\ l$. The leaves can then be raised or lowered to the desired angle when, on relieving the upward pressure upon the rod $m\ m$, the rods $i\ i$ will engage with the said notches and rigidly lock and hold the braces $e\ e$, thereby sustaining the leaves firmly, and also permitting the whole stand to be lifted by the leaves, without unlocking the braces.

From the foregoing description it will be seen that the braces $e,\ e$ are kept, at whatever angle the leaves may be set, in the strongest possible position for sustaining the weight, viz, in front of the leaves and in a vertical or nearly vertical position, while at the same time they are rigidly locked to the framework of the stand.

It will be evident that the ends of the rods $i\ i$ may be fitted with friction rollers to facilitate their movement in the grooves $k,\ k$ and that the devices employed for locking the braces $e\ e$ may also be applied to locking doors, book-cases, and other articles of furniture.

Having thus described my improvements I shall state my claim as follows:

What I claim as my invention and desire to have secured to me by Letters Patent is—

Arranging the braces or sliding frames which are hinged to and support the adjustable leaves of a portfolio stand, in such a way that they shall in sliding always keep in nearly a vertical position for the better supporting the leaves and the weight upon them, by having the traversing and bolting rods move in curved grooves directly beneath them in the sides of the stand, instead of having the bolting rods of each brace or frame slide in grooves on the other or opposite side of the center of said stand, in combination with the locking devices herein above described for the purpose of rigidly locking and supporting the leaves, and whereby the whole stand can be lifted by the leaves in removing it from place to place

AUGUSTUS ELIAERS.

Witnesses:
 JOSEPH GAVETT,
 SAMUEL N. PIPER.